(12) United States Patent
Kirby et al.

(10) Patent No.: US 8,810,194 B2
(45) Date of Patent: Aug. 19, 2014

(54) RETROFITTING WIRELESS POWER AND NEAR-FIELD COMMUNICATION IN ELECTRONIC DEVICES

(75) Inventors: Miles A Kirby, San Diego, CA (US); Matthew S Grob, La Jolla, CA (US); Ernest T Ozaki, Poway, CA (US); Stanley S Toncich, San Diego, CA (US); Nigel P Cook, El Cajon, CA (US); Stanley B Kinsey, San Diego, CA (US); John Hillan, Alton (GB); Stephen Frankland, Horsham (GB)

(73) Assignee: Qualcomm Incorporated, San Diego, CA (US)

( * ) Notice: Subject to any disclaimer, the term of this patent is extended or adjusted under 35 U.S.C. 154(b) by 365 days.

(21) Appl. No.: 12/610,831

(22) Filed: Nov. 2, 2009

(65) Prior Publication Data
US 2010/0194334 A1    Aug. 5, 2010

Related U.S. Application Data (60) Provisional application No. 61/116,608, filed on Nov. 20, 2008, provisional application No. 61/150,257, filed on Feb. 5, 2009, provisional application No. 61/163,387, filed on Mar. 25, 2009.

(51) Int. Cl.
| | |
|---|---|
| *H02J 7/00* | (2006.01) |
| *H01M 10/46* | (2006.01) |
| *H02J 7/02* | (2006.01) |
| *H02J 17/00* | (2006.01) |

(52) U.S. Cl.
CPC .................. *H02J 7/022* (2013.01); *Y02E 60/12* (2013.01); *H01M 10/46* (2013.01); *H02J 17/00* (2013.01); *H02J 7/0045* (2013.01)
USPC .......................................... 320/108; 320/112

(58) Field of Classification Search
USPC ................................................. 320/108, 112
See application file for complete search history.

(56) References Cited

U.S. PATENT DOCUMENTS

| 7,791,312 B2 * | 9/2010 | Kook ............................ 320/108 |
| 8,111,042 B2 * | 2/2012 | Bennett ........................ 320/108 |

(Continued)

FOREIGN PATENT DOCUMENTS

| CN | 2552234 Y | 5/2003 |
| CN | 101147308 A | 3/2008 |

(Continued)

OTHER PUBLICATIONS

International Search Report & Written Opinion—US2009/068579—International Search Authority—European Patent Office—Jun. 11, 2010.

*Primary Examiner* — Richard V Muralidar
(74) *Attorney, Agent, or Firm* — Knobbe, Martens, Olson & Bear LLP (57) ABSTRACT

Exemplary embodiments are directed to retrofitting existing electronic devices for wireless power transfer and near-field communication. Retrofitting circuitry includes an antenna for receiving a signal from an external source, and conversion circuitry for converting the signal to be used by an electronic device. The antenna and conversion circuitry are configured to retrofit to the electronic device, where the electronic device did not originally include the antenna or conversion circuitry. The antenna and conversion circuitry may be configured to receive and convert the signal to generate wireless power for the electronic device. The antenna and the conversion circuitry may also be configured to enable the electronic device to send and receive near-field communication data.

26 Claims, 7 Drawing Sheets

(56) References Cited

U.S. PATENT DOCUMENTS

| | | |
|---|---|---|
| 2006/0139005 A1 | 6/2006 | Niculae et al. |
| 2007/0029965 A1* | 2/2007 | Hui .............................. 320/112 |
| 2008/0200210 A1 | 8/2008 | Lim et al. |
| 2009/0286475 A1 | 11/2009 | Toncich et al. |

FOREIGN PATENT DOCUMENTS

| | | |
|---|---|---|
| CN | 101228678 A | 7/2008 |
| DE | 102004039651 | 3/2006 |
| EP | 886232 A2 | 12/1998 |
| EP | 1804393 A2 | 7/2007 |
| JP | 2004350465 A | 12/2004 |
| JP | 2005027496 A | 1/2005 |
| JP | 2006510101 A | 3/2006 |
| JP | 2006314181 A | 11/2006 |
| JP | 2008141940 A | 6/2008 |
| KR | 20080036702 A | 4/2008 |
| KR | 20080076477 A | 8/2008 |
| WO | WO2004055654 A2 | 7/2004 |
| WO | WO-2006085246 A1 | 8/2006 |
| WO | WO2009050625 A2 | 4/2009 |

* cited by examiner

RETROFITTING WIRELESS POWER AND NEAR-FIELD COMMUNICATION IN ELECTRONIC DEVICES

CLAIM OF PRIORITY UNDER 35 U.S.C. §119

This application claims priority under 35 U.S.C. §119(e) to:

U.S. Provisional Patent Application 61/150,257 entitled "WIRELESS POWER BATTERY PACK" filed on Feb. 5, 2009, and assigned to the assignee hereof and hereby expressly incorporated by reference herein;

U.S. Provisional Patent Application 61/163,387 entitled "BATTERY ASSEMBLY WITH BUILT IN WIRELESS POWER ANTENNA" filed on Mar. 25, 2009, and assigned to the assignee hereof and hereby expressly incorporated by reference herein; and U.S. Provisional Patent Application 61/116,608 entitled "WIRELESS POWER BATTERY REPLACEMENT" filed on Nov. 20, 2008, and assigned to the assignee hereof and hereby expressly incorporated by reference herein.

BACKGROUND

1. Field

The present invention relates generally to wireless charging, and more specifically to devices, systems, and methods related to wireless power chargers.

2. Background

Typically, each battery-powered device such as a wireless communication device (e.g. a cell phone) requires its own charger and power source, which is usually the AC power outlet. This becomes unwieldy when many devices need charging, each requiring its own separate charger.

Approaches are being developed that use over-the-air or wireless power transmission between a transmitter and a receiver coupled to the electronic device to be charged. Such approaches generally fall into two categories. One is based on the coupling of plane wave radiation (also called far-field radiation) between a transmit antenna and a receive antenna on the device to be charged. The receive antenna collects the radiated power and rectifies the radiated power for charging the battery. Antennas are generally of resonant length in order to improve the coupling efficiency. This approach suffers from the fact that the power coupling falls off quickly with distance between the antennas, so charging over reasonable distances (e.g., less than 1 to 2 meters) becomes difficult. Additionally, because the transmitting system radiates plane waves, unintentional radiation may interfere with other systems if not properly controlled through filtering.

Other approaches to wireless energy transmission techniques are based on inductive coupling between a transmit antenna embedded, for example, in a "charging" device, mat, or surface and a receive antenna (plus a rectifying circuit) embedded in the host electronic device to be charged. This approach has the disadvantage that the spacing between transmit and receive antennas must be very close (e.g., within thousandths of meters). Though this approach does have the capability to simultaneously charge multiple devices in the same area, this area is typically very small and requires the user to accurately locate the devices to a specific area.

In addition to added convenience of simultaneous charging, environmental and cost concerns may also be addressed with wireless charging. Currently, many electronic devices are currently in use, which are powered by standard size batteries such as AA, AAA, D, C Cell, 9-Volt, etc., formats. These batteries may be primary cells or rechargeable, secondary cells. The primary cells are disposable and raise environmental issues. Rechargeable, secondary cells may help to address the environmental concern, but rechargeable, secondary cells may still require being removed from the device to be charged, which may include placing the rechargeable, secondary cells in a charger that may only have limit spaces for batteries, typically four batteries. With the advantages of wireless power charging, there may exist a need to convert (i.e., retrofit) existing devices which are powered by primary or secondary cells to be wireless be a wireless powered enabled device to recharge batteries or operate in a wireless charging field.

DETAILED DESCRIPTION

The word "exemplary" is used herein to mean "serving as an example, instance, or illustration." Any embodiment described herein as "exemplary" is not necessarily to be construed as preferred or advantageous over other embodiments.

The detailed description set forth below in connection with the appended drawings is intended as a description of exemplary embodiments of the present invention and is not intended to represent the only embodiments in which the present invention may be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. Those skilled in the art will recognize that the exemplary embodiments of the invention may be practiced without these specific details. In some instances, well-known structures and devices are shown in block diagram form in order to avoid obscuring the novelty of the exemplary embodiments presented herein.

The words "wireless power" are used herein to mean any form of energy associated with electric fields, magnetic_ fields, electromagnetic fields, or otherwise that is transmitted from a transmitter to a receiver without the use of physical electromagnetic conductors.

Figure 1:
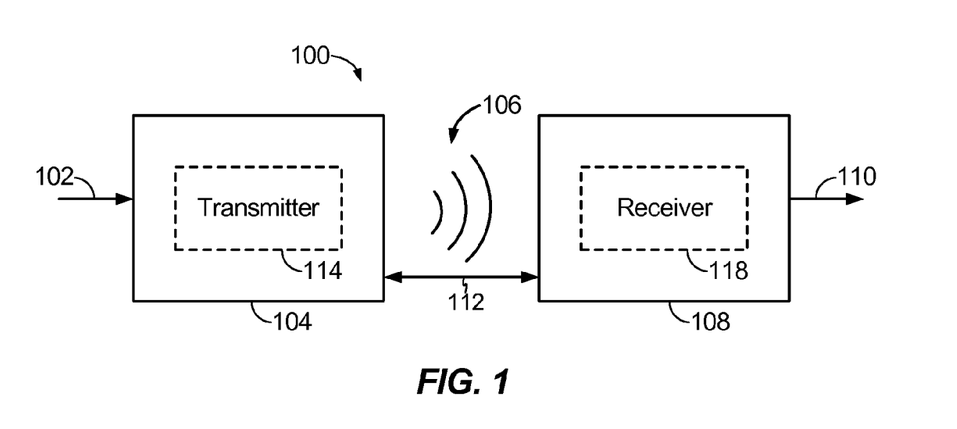
FIG. 1 illustrates a simplified block diagram of a wireless power transfer system.

FIG. 1 illustrates wireless transmission or charging system 100, in accordance with various exemplary embodiments of the present invention. Input power 102 is provided to a transmitter 104 for generating a radiated field 106 for providing energy transfer. A receiver 108 couples to the radiated field 106 and generates an output power 110 for storing or consumption by a device (not shown) coupled to the output power 110. Both the transmitter 104 and the receiver 108 are separated by a distance 112. In one exemplary embodiment, transmitter 104 and receiver 108 are configured according to a mutual resonant relationship and when the resonant frequency of receiver 108 and the resonant frequency of transmitter 104 are exactly identical, transmission losses between the transmitter 104 and the receiver 108 are minimal when the receiver 108 is located in the "near-field" of the radiated field 106.

Transmitter 104 further includes a transmit antenna 114 for providing a means for energy transmission and receiver 108 further includes a receive antenna 118 for providing a means for energy reception. The transmit and receive antennas are sized according to applications and devices to be associated therewith. As stated, an efficient energy transfer occurs by coupling a large portion of the energy in the near-field of the transmitting antenna to a receiving antenna rather than propagating most of the energy in an electromagnetic wave to the far-field. When in the near-field a coupling mode may be developed between the transmit antenna 114 and the receive antenna 118. The area around the antennas 114 and 118 where the near-field coupling may occur is referred to herein as a coupling-mode region.

Figure 2:
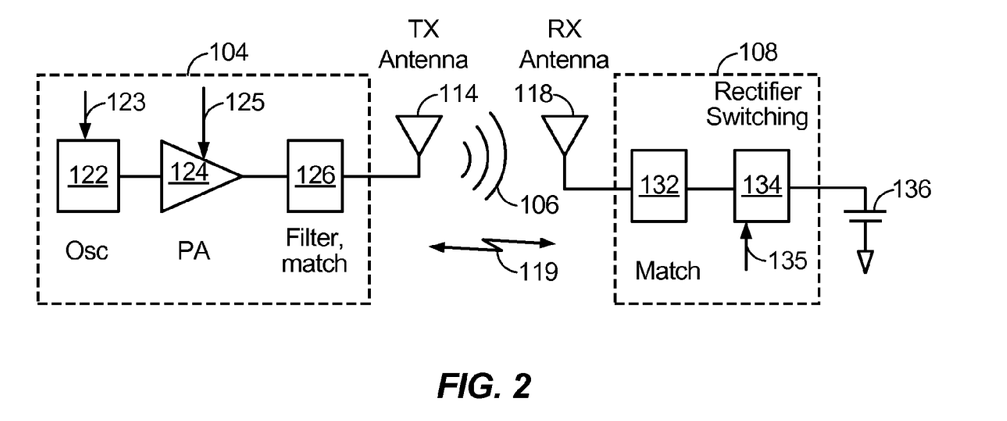
FIG. 2 illustrates a simplified schematic diagram of a wireless power transfer system.

FIG. 2 shows a simplified schematic diagram of a wireless power transfer system. The transmitter 104 includes an oscillator 122, a power amplifier 124 and a filter and matching circuit 126. The oscillator is configured to generate an oscillator signal at a desired frequency, which may be adjusted in response to adjustment signal 123. The oscillator signal may be amplified by the power amplifier 124 with an amplification amount responsive to control signal 125. The filter and matching circuit 126 may be included to filter out harmonics or other unwanted frequencies and match the impedance of the transmitter 104 to the transmit antenna 114.

The receiver 108 may include a matching circuit 132 and a rectifier and switching circuit 134 to generate a DC power output to charge a battery 136 as shown in FIG. 2 or power a device coupled to the receiver (not shown). The matching circuit 132 may be included to match the impedance of the receiver 108 to the receive antenna 118. As used herein, the term "battery" may include items in addition to the storage cells themselves, such as over-voltage protection circuits.

Figure 3A:
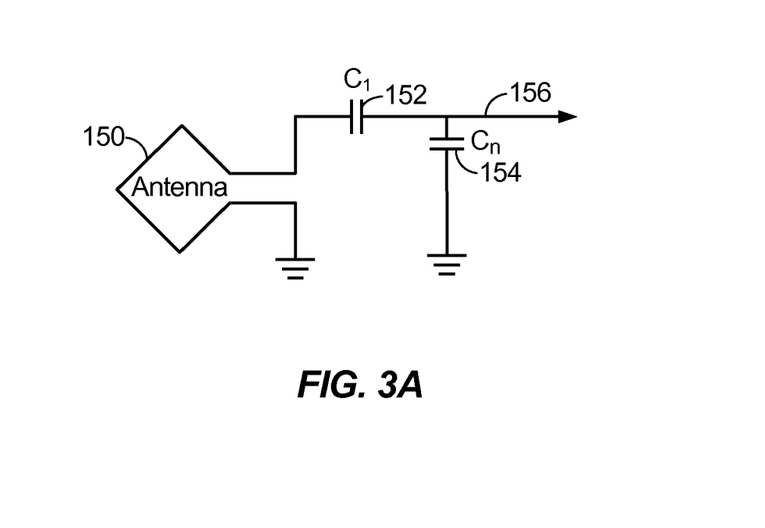
FIG. 3A illustrates a schematic diagram of a loop antenna for use in exemplary embodiments of the present invention.

As illustrated in FIG. 3A, antennas used in exemplary embodiments may be configured as a "loop" antenna 150, which may also be referred to herein as a "magnetic" antenna. Loop antennas may be configured to include an air core or a physical core such as a ferrite core. Air core loop antennas may be more tolerable to extraneous physical devices placed in the vicinity of the core. Furthermore, an air core loop antenna allows the placement of other components within the core area. In addition, an air core loop may more readily enable placement of the receive antenna 118 (FIG. 2) within a plane of the transmit antenna 114 (FIG. 2) where the coupled-mode region of the transmit antenna 114 (FIG. 2) may be more powerful.

As stated, efficient transfer of energy between the transmitter 104 and receiver 108 occurs during matched or nearly matched resonance between the transmitter 104 and the receiver 108. However, even when resonance between the transmitter 104 and receiver 108 are not matched, energy may be transferred at a lower efficiency. Transfer of energy occurs by coupling energy from the near-field of the transmitting antenna to the receiving antenna residing in the neighborhood where the near-field is established rather than propagating the energy from the transmitting antenna into free space.

The resonant frequency of the loop or magnetic antennas is based on the inductance and capacitance. Inductance in a loop antenna is generally the inductance created by the loop, whereas, capacitance is generally added to the loop antenna's inductance to create a resonant structure at a desired resonant frequency. As a non-limiting example, capacitor 152 and capacitor 154 may be added to the antenna to create a resonant circuit that generates resonant signal 156. Accordingly, for larger diameter loop antennas, the size of capacitance needed to induce resonance decreases as the diameter or inductance of the loop increases. Furthermore, as the diameter of the loop or magnetic antenna increases, the efficient energy transfer area of the near-field increases. Of course, other resonant circuits are possible. As another non-limiting example, a capacitor may be placed in parallel between the two terminals of the loop antenna. In addition, those of ordinary skill in the art will recognize that for transmit antennas the resonant signal 156 may be an input to the loop antenna 150.

Figure 3B:
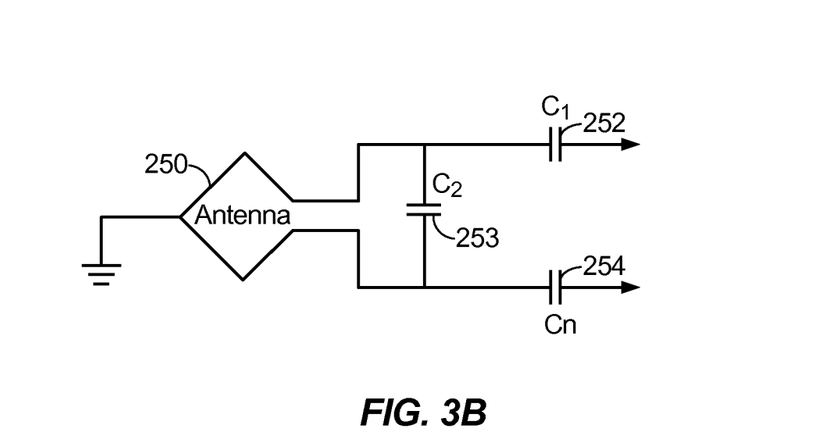
FIG. 3B illustrates an alternate embodiment of a differential antenna used in exemplary embodiments of the present invention.

FIG. 3B illustrates an alternate embodiment of a differential antenna 250 used in exemplary embodiments of the present invention. Antenna 250 may be configured as a differential coil antenna. In a differential antenna configuration, the center of antenna 250 is connected to ground. Each end of antenna 250 are connected into a receiver/transmitter unit (not shown), rather than having one end connected to ground as in FIG. 3A. Capacitors 252, 253, 254 may be added to the antenna 250 to create a resonant circuit that generates a differential resonant signal. A differential antenna configuration may be useful in situations when communication is bidirectional and transmission into the coil is required. One such situation may be for Near Field Communication (NFC) systems.

Exemplary embodiments of the invention include coupling power between two antennas that are in the near-fields of each other. As stated, the near-field is an area around the antenna in which electromagnetic fields exist but may not propagate or radiate away from the antenna. A near-field is typically confined to a volume that is near the physical volume of the antenna. In the exemplary embodiments of the invention, magnetic type antennas such as single and multi-turn loop antennas are used for both transmit (Tx) and receive (Rx) antenna systems because magnetic near-field amplitudes tend to be higher for magnetic type antennas in comparison to the electric near-fields of an electric-type antenna (e.g., a small dipole), allowing for potentially higher coupling between the pair. However, "electric" antennas (e.g., dipoles and monopoles) or a combination of magnetic and electric antennas are also contemplated as within the scope of the present invention.

The Tx antenna may be operated at a frequency that is low enough. and with an antenna size that is large enough. to achieve good coupling (e.g., >−4 dB) to a small Rx antenna at significantly larger distances than allowed by far-field and inductive approaches mentioned earlier. If the Tx antenna is sized correctly, high coupling levels (e.g., −1 to −4 dB) may be achieved when the Rx antenna on a host device is placed within a coupling-mode region (i.e., in the near-field) of the driven Tx loop antenna.

Electronic devices may be manufactured in the future with wireless power and/or NFC built into the electronic device. However, many electronic devices are currently in use, which use regular disposable or rechargeable batteries which are not wireless power enabled, and which are not NFC enabled. Embodiments of the present invention include embodiments which retrofit electronic devices which originally were not built with wireless power technology or NFC, yet these legacy electronic devices exist with users. Such embodiments may include customized battery packs, customized replacement housings, retrofitting standard battery packs, and so forth.

"Retrofit" as used herein means modifying an existing electronic device with an existing battery and a battery cavity with a form factor for holding the existing battery within the electronic device to include additional functionality for charging the existing battery or charging a new battery disposed in the electronic devices as a replacement for the existing battery.

Figure 4:
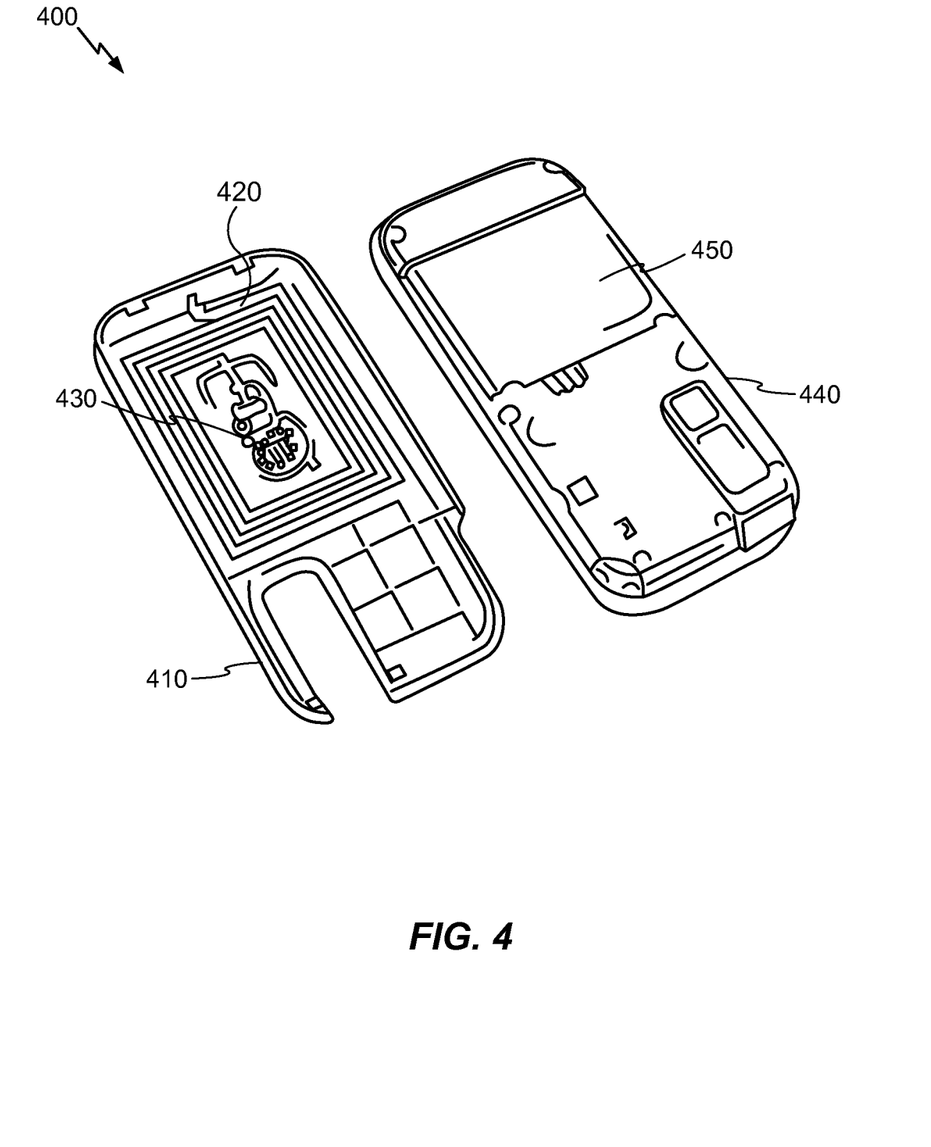
FIG. 4 illustrates an electronic device with retrofitting circuitry according to an exemplary embodiment of the present invention.

FIG. 4 illustrates an electronic device 400 with retrofitting circuitry according to an embodiment of the present invention. Electronic device 400 may include a back housing 410 with a wireless power receive antenna 420 and conversion circuitry 430. Electronic device 400 may include a front housing 440 including internal electronic circuitry (not shown) for the electronic device 400, and a battery 450. As shown in FIG. 4, back housing 410 may be removed from front housing 440. With back housing 410 removed and separated from front housing 440, battery 450, antenna 420, and conversion circuitry 430 may be exposed. Antenna 420 may be placed or integrally formed with the back housing 410. Antenna 420 and conversion circuitry 430 may be manufactured with back housing 410 separately from front housing 440. As such, back housing 410 may be configured to fit existing electronic devices and replace corresponding original housing portions for electronic devices which were not originally wireless power enabled.

Antenna 420 and conversion circuitry 430 may be configured receive and convert a signal from an external device and to retrofit to the electronic device, wherein the electronic device did not originally include the antenna 420 or conversion circuitry 430. The external source may be a wireless power transmitter, and the antenna 420 and conversion circuitry 430 may be further configured to receive and convert the signal to generate wireless power for the electronic device 400. As such, the conversion circuitry 430 may include wireless power receive circuitry such as matching circuitry 132 and rectifier circuitry 134 (FIG. 2). The antenna 420 and conversion circuitry 430 may also be configured to enable the electronic device to send and receive NFC data.

Details of exemplary communication mechanisms and protocols for NFC can be seen in U.S. Utility patent application Ser. No. 12/249,866 entitled "SIGNALING CHARGING IN WIRELESS POWER ENVIRONMENT" filed on Oct. 10, 2008, the contents of which is incorporated by reference herein in its entirety.

Antenna 420 may be routed for clearance around metallic obstructions (such as other antennas or ground planes) in order to enable and improve performance of the generation of the magnetic field around the antenna 420. In one embodiment, conversion circuitry 430 may be configured as a discrete component, such as an ASIC. In operation, the electronic device 400 may be placed within range of a transmit antenna (not shown) and the battery 450 may be charged without the need for the battery 450 to be removed from the electronic device 400 or the electronic device 400 to be connected to and AC outlet.

Figure 5:
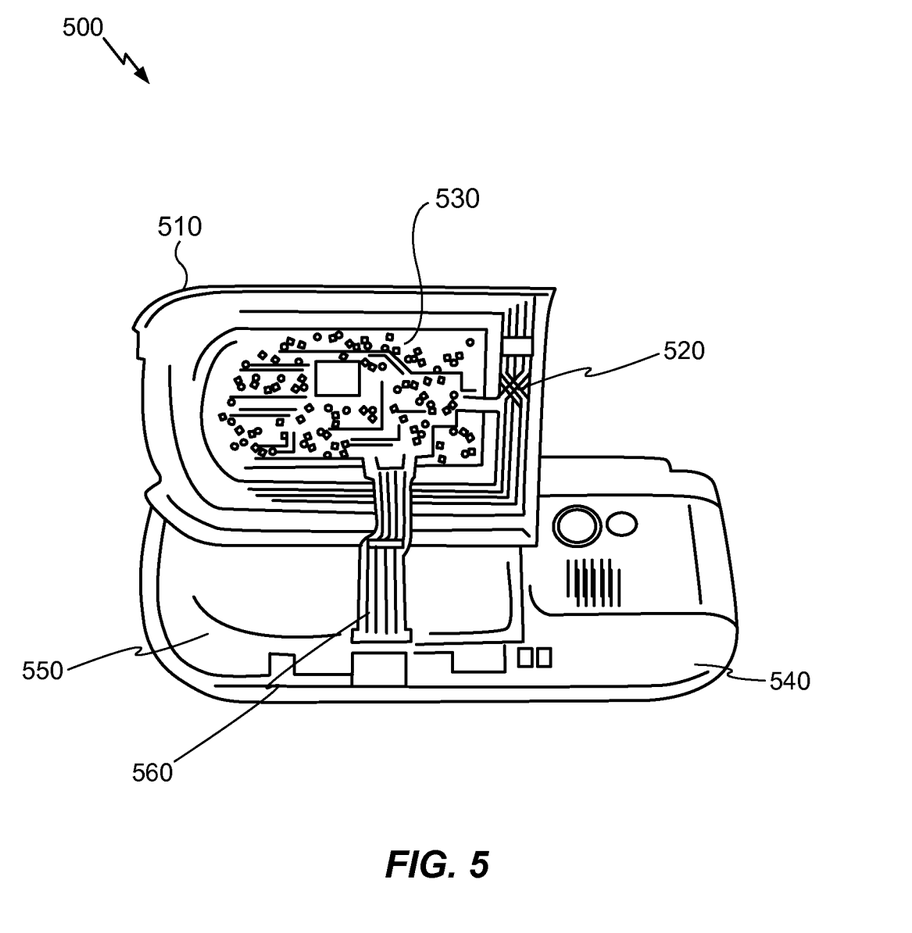
FIG. 5 illustrates an electronic device with retrofitting circuitry for wireless power according to an exemplary embodiment of the present invention.

In operation, back housing 410 may be configured to connect to front housing 440 such that an electrical connection is made between conversion circuitry 430 and battery 450. The electrical connection between conversion circuitry 430 and battery 450 may be through contacts of conversion circuitry 430 touching contacts of battery 450 to establish the electrical connection. An alternative exemplary embodiment (such as is shown in FIG. 5) may include a connector (such as a cable) extending from conversion circuitry 430 to establish electrical contact with contacts of battery 450. The battery 450 may be a battery originally intended to operate electronic device 400, however, battery 450 may be custom made to fit a form factor for the existing battery of the electronic device 400, connect to conversion circuitry 430, and, if needed, allow space for the antenna 420 and the conversion circuitry 430.

In another exemplary embodiment, the antenna 420 and conversion circuitry 430 may be manufactured separately from back housing 410, such as in the form of kit. Such a kit may then be retrofitted into the electronic device 400 originally made without wireless power charging or NFC capabilities. The kit, including antenna 420 and conversion circuitry 430, may be configured to be attached to or incorporated with the electronic device 400, such as with the original back housing 410. These actions of attaching may be performed by a user, the provider of the electronic device 400, or another party related thereto.

To determine if the batteries are rechargeable, the charging device (i.e., retrofitted antenna 420 and conversion circuitry 430) may communicate with the electronic device 400 via wireless charging NFC or other short range communications (e.g., Zigbee, Bluetooth, etc.) to determine that the storage cells are suitable for recharging (i.e., not primary cells). The charging device may also communicate with the electronic device 400 to determine battery technology (e.g., nickel cadmium, nickel metal hydride, lithium ion, etc.) in order to apply an appropriate charging protocol.

For exemplary purposes, electronic device 400 may be a cell phone as shown in FIG. 4. However, those of ordinary skill in the art will recognize that the exemplary embodiments of the invention are not limited to such electronic devices. Other electronic devices may include personal digital assistants, audio/video devices, cameras, battery-powered power tools, remote controls, computer mice, lap top computers, and other battery-powered electronic devices.

FIG. 5 illustrates an electronic device 500 with retrofitting circuitry for wireless power according to an exemplary embodiment of the present invention. Electronic device 500 may include a back housing 510 with a wireless power receive antenna 520 and wireless power receive circuitry 530. Electronic device 500 may include a front housing 540 including internal electronic circuitry (not shown) for operation of the electronic device 500, a battery (not shown), and shielding 550. As shown in FIG. 5, shielding 550 is covering the battery. Shielding 550 may be configured to isolate the antenna from a metal casing which may surround the battery, which will be discussed in more detail later.

As shown in FIG. 5, back housing 510 may be removed from front housing 540. With back housing 510 removed and separated from front housing 540, shielding 550, wireless power receive antenna 520, and wireless power receive circuitry 530 may be exposed. Wireless power receive antenna 520 may be placed or integrally formed with the back housing 510. Wireless power receive antenna 520 and wireless power receive circuitry 530 may be manufactured with back housing 510 separately from front housing 540. As such, back housing 510 may be configured to fit existing electronic devices and replace original back housings for electronic devices which were not originally wireless power enabled.

In operation, back housing 510 may be configured to connect to front housing 540 such that an electrical connection is made between wireless power receive circuitry 520 and the battery. The electrical connection between wireless power receive circuitry 520 and the battery may be through contacts of wireless power receive circuitry 520 making electrical contact with contacts of the battery to establish the electrical connection. Alternatively, as shown in FIG. 5, electronic device 500 may include a connector 560 (such as a cable) extending from wireless power receive circuitry 520 through shield 550 to establish electrical connection with contacts of the battery in order to charge the battery during wireless power charging.

Figure 6A:
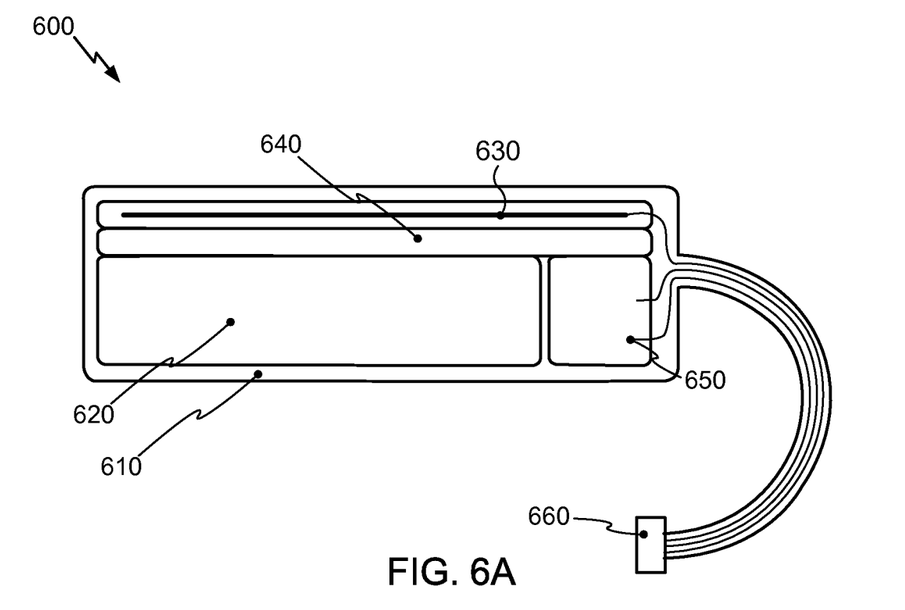
FIG. 6A illustrates a cross sectional view of an integrated storage device according to an exemplary embodiment of the present invention.

FIG. 6A illustrates a cross sectional view of an integrated storage device 600 according to an embodiment of the present invention. Integrated storage device 600 includes storage cells 620, antenna 630, shielding 640, and other circuitry 650 in a common housing enclosure 610.

The common housing enclosure 610 may be shaped and dimensioned to the same form factor as a regular battery used with an electronic device. The integrated storage device 600 may then be inserted into an electronic device in lieu of the original battery to provide the electronic device with a battery (i.e., storage cells 620) that can be charged with wireless power from a transmit antenna (not shown). The integrated storage device may also include NFC capabilities as explained above.

Figure 6B:
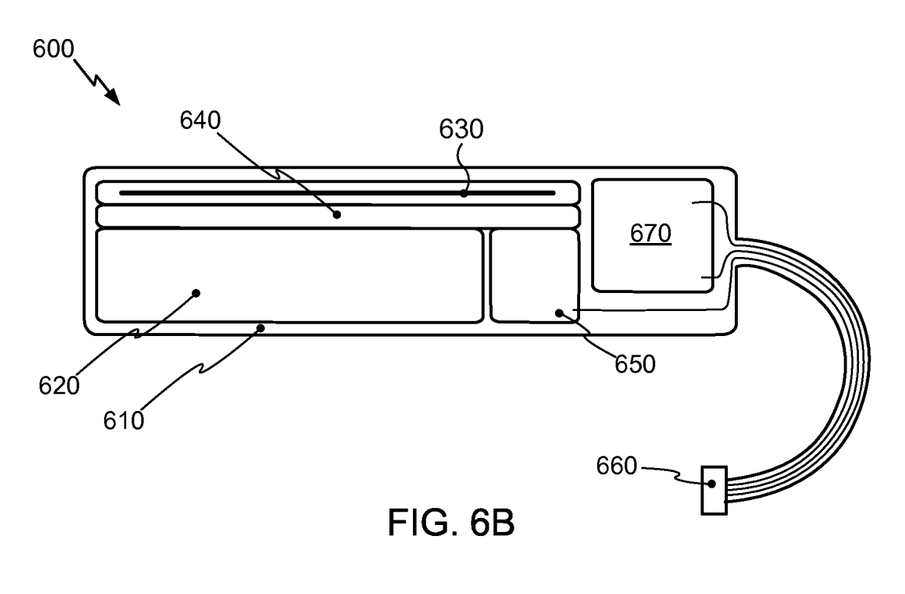
FIG. 6B illustrates a cross sectional view of an integrated storage device according to another exemplary embodiment of the present invention.
Figure 6C:
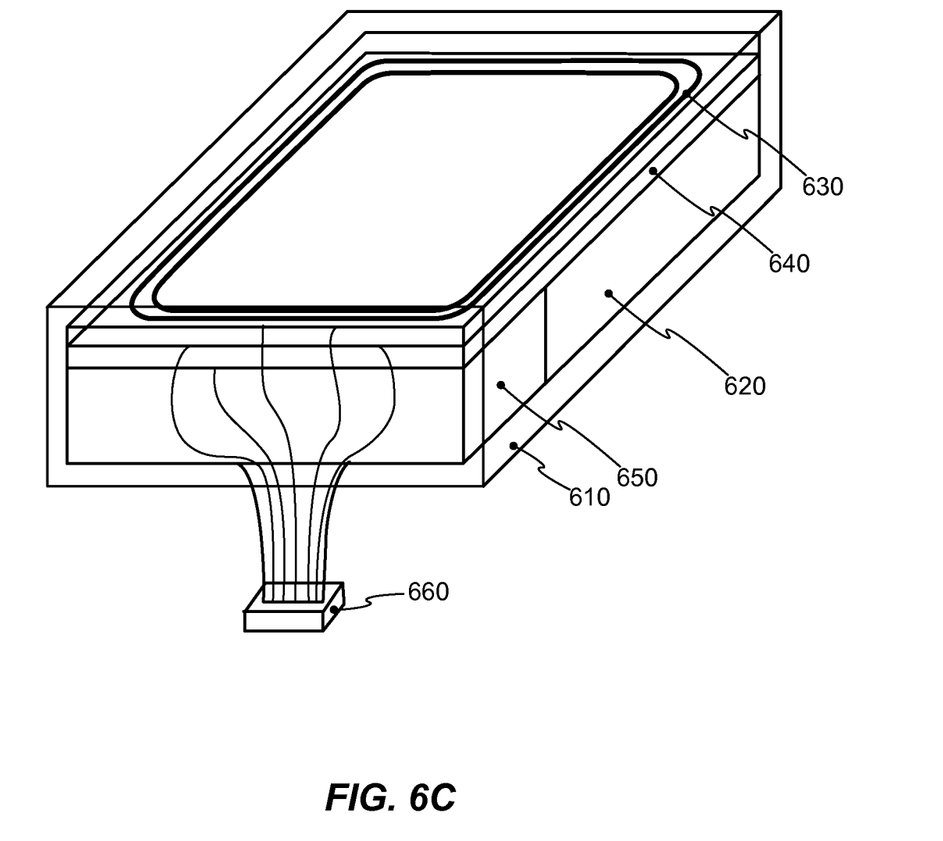
FIG. 6C illustrates a perspective view of an integrated storage device according to an exemplary embodiment of the present invention.

Connector 660 may be configured to make electrical contacts with the electronic device in a similar manner as the electronic devices original battery would in order to provide the electronic device with electrical power. Connector 660 may be a cable as shown in FIGS. 6A-6C, or alternatively a set of contacts to establish an electrical connection with contacts that a normal battery would contact in order to power the electronic device.

Antenna 630 may be configured to receive wireless power and NFC, such as a coil antenna. In other words, the antenna may be configured to either receive wireless power transmissions, to receive NFC transmissions, or a combination of both. When configured to receive both, antenna 630 may be shared by both the wireless power system and the original electronics of the electronic device, which may be a cost effective way to integrate both wireless power and NFC in an existing electronic devices which currently do not have such capabilities.

Storage cells 620 may be configured as any type of battery storage cells, such as, for example, a lithium ion battery. Because the common housing enclosure 610 of integrated storage device 620 may be configured to replace an existing battery of an electronic device, yet with additional circuitry, the physical area of storage cells 620 may be physically smaller than the corresponding storage cells within the existing battery that the integrated storage device 600 is to replace in the electronic device. However, storage cells 620 may be electrically the same, or larger than, the storage cells of the previous battery.

Shielding 640 may be a protective magnetic field shaping material located between storage cells 620 and antenna 630. Shielding 640 may be configured to isolate the antenna from a metal casing which may surround the storage cells 620. In other words, shielding 640 may have the effect of localizing the magnetic field to reduce disruptive effects that the storage cells 620 may have on the performance of the antenna 630.

Shielding may be made of a ferrite material, such as FLEXIELD, which is available from TDK Corporation of Tokyo, Japan.

The other circuitry 650 may provide the integrated storage device 600 with the capability to convert an electronic device to be wireless power enabled, or to be NFC enabled, or both wireless power enabled and NFC enabled. Examples of such circuitry include matching circuitry and rectifier circuitry as discussed above with respect to FIG. 2. Other circuitry 650 may also include over-voltage protection circuitry if overprotection circuitry is not built into the storage cells 620.

Additionally, the integrated storage device 600 may include an indicator (e.g., visual or audio) that is activated (e.g., light flashes from a light emitting diode or some audio indication) when the associated electronic device is in range of the wireless power transmit charging field. Integrated storage device 600 may also include a magnetically transparent packaging material surrounding the components for additional robustness to the magnetic field.

In operation, integrated storage device 600 may be configured to receive wireless power when within a radiated field generated by a transmitter of a wireless power charger. The wireless power may be stored within the storage cells 620, such as a battery. Stored charge from storage cells 620 may then be used to power the associated electronic device. Alternatively, power received by integrated wireless storage device 600 may power the electronic device directly rather than storing the power in the storage cells 620. In other words, one use may be to charge the storage cells 620 for powering the electronic device, and another use may be to power the electronic device directly if the electronic device is in range of the radiated field of the transmit antenna. As previously described, wireless charging includes a transmitting antenna that supplies power to a receive antenna in the electronic device to be charged, which then feeds a rectifying circuit that converts the received power to DC power. The DC power may charge the electronic device's battery or provide power for contemporaneous operation. Generally speaking, integrated storage device 600 may combine the receive antenna 630, storage cells 620 (e.g., battery), and other circuitry 650 (e.g., rectifying circuitry along with circuits used for signaling the charging transmit antenna) into a common housing enclosure 610 that replaces the existing battery pack of an electronic device.

Alternatively, or in addition, integrated storage device 600 may be configured to enable an electronic device to send and receive NFC through antenna 630. By using an integrated storage device 600 to replace an existing battery pack, the electronic device may not require software modifications. Using an integrated storage device 600 may be advantageous because many electronic devices have custom software that allows the electronic device to be charged only with an AC adapter that is custom to the particular electronic device. Charging directly at the existing battery terminal may alleviate these software compatibility problems, because as to the software in the electronic device, the power may appear as though the power is provided by a regular battery. Additionally, because the integrated storage device 600 may be configured to conform to the size and shape of the existing battery of the electronic device, the original industrial design of the electronic device may be maintained. Additionally, the integrated storage device 600 may allow for a user to simply upgrade their current electronic device by replacing the existing battery pack with the integrated storage device 600.

The integrated storage device 600 with a common housing enclosure 610 may be able to maintain a more constant resonance across different integrated storage devices 600. Relative positions and spacing of the antenna 630, shielding 640, and storage cells 620 may contribute significantly in the correct tuning of the antenna 630. If the components (e.g., storage cells 620, antenna 630, shielding 640, etc.) are loose, various spacing between such components may result in different resonant frequencies. In other words, providing an integrated storage device 600 may allow the performance of the wireless power or the NFC communication to be more reliable and repeatable.

FIG. 6B illustrates a cross sectional view of an integrated storage device 600 according to another exemplary embodiment of the present invention. Integrated storage device 600 includes storage cells 620, antenna 630, shielding 640, and other circuitry 650 in a common housing enclosure 610 with a connector 660, each configured as before as with FIG. 6A. Integrated storage device 600 additionally includes receive circuitry 670 which may be in a different module from other circuitry 650. Receive circuitry 670 may include circuitry related to wireless power and/or NFC conversion. Examples of such circuitry may include a rectifier, filter and regulator that convert the power received by the antenna 630 into DC power.

FIG. 6C illustrates a perspective view of an integrated storage device 600 according to an exemplary embodiment of the present invention. Integrated storage device 600 includes storage cells 620, antenna 630, shielding 640, and other circuitry 650 in a common housing enclosure 610 with a connector 660, each configured as before as with FIG. 6A. Circuitry for wireless power conversion, NFC, or a combination thereof may be included within other circuitry 650, or in another module 670 such as is shown in FIG. 6B. Alternatively, circuitry for NFC and/or wireless power conversion may be housed outside of integrated storage device 600, however, doing so may require antenna 630 connections to exist outside of the integrated storage device 600.

Figure 7:
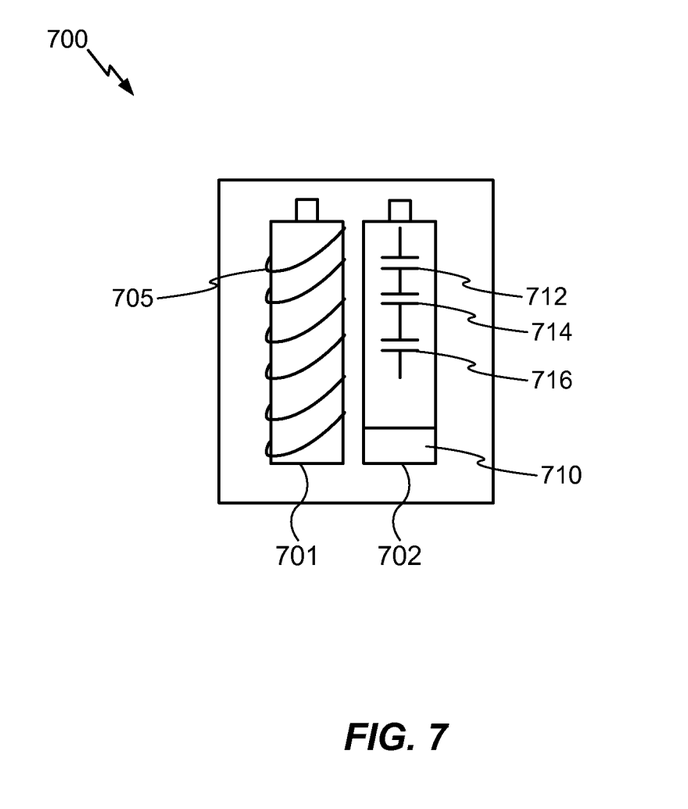
FIG. 7 illustrates an integrated storage device according to yet another exemplary embodiment of the present invention.

FIG. 7 illustrates an integrated storage device 700 according to yet another embodiment of the present invention. Integrated storage device 700 may be configured to be the shape and size (i.e., fit into the same form factor) of an existing battery and to have the same electrode connections as the existing battery. For example, an electronic device may be powered by disposable batteries, such as AA batteries 701 and 702. These battery types may often be used in a battery compartment for a portable electronic item such as a flashlight or a toy. In this exemplary embodiment, retrofit batteries 701 and 702 include a coil antenna 705, which may placed around the edge of one or both of the circumferences of the batteries 701, 702. In addition, a portion of the retrofit batteries 701 and 702 may be formed of electronic circuitry 710 including a rectifier, filter, regulator and other circuitry needed for enabling the device to receive wireless power, NFC, or a combination thereof. By placing the associated electronic device, or the retrofit batteries 701, 702 separately in a the coupling-mode region of a transmit antenna, the storage cells, shown generally as 712, 714, 716, in the remainder of the battery 702 may be wirelessly charged.

Integrated storage device 700 therefore, includes both storage cells 712, 714, 716, the coil antenna 705, and associated electronic circuitry 710 in a common housing. Integrated storage device 700 may be used to retrofit the electronic device to operate according to wireless power reception or to be NFC enabled, by allowing wireless charging of the replaced battery by the new wirelessly-charged battery assembly. The physical space used by the storage cells in the battery may be reduced because some area of the battery may be reserved for the additional electronics circuits. However, the electrical performance of the battery may be substantially similar to the existing batteries being replaced. Although, AA batteries are shown in FIG. 7, these exemplary battery shapes and sizes should not be viewed as limiting. Integrated storage devices may be configured to be shaped or sized as any type of battery, such as, for example, AA, AAA, C cell, D cell, 9-Volt, lithium ion, nickel cadmium, and nickel metal hydride batteries.

In another exemplary embodiment, the housings of certain existing electronic devices may be too thick, or provide too much internal shielding, which may not permit the wireless charging field to penetrate the housing of the existing electronic device. In this other exemplary embodiment, batteries which are wireless power enabled, such as those in FIGS. 4-7 may be removed from the electronic device and placed within a wireless power field, such as on a charging pad. Removing such a battery may remove the battery from the shielded area to allow for wireless coupling to occur. Once charged through wireless power reception, the wireless-power-enabled batteries may be replaced in the electronic device.

In another exemplary embodiment, wireless power conversion hardware may be configured as a device which connects externally to the electronic device, such as at a DC input to the electronic device.

The approach described herein is applicable to variety of communication standards such as CDMA, WCDMA, OFDM, 802.11, GPS, Bluetooth, LGE, and the like. Those of ordinary skill in the art would understand that information and signals may be represented using any of a variety of different technologies and techniques. For example, data, instructions, commands, information, signals, bits, symbols, and chips that may be referenced throughout this detailed description may be represented by voltages, currents, electromagnetic waves, magnetic fields or particles, optical fields or particles, or any combination thereof.

Those of ordinary skill will appreciate that the various illustrative logical blocks, modules, circuits, and algorithm steps described in connection with the exemplary embodiments disclosed herein may be implemented as electronic hardware, computer software, or combinations of both. To clearly illustrate the interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the exemplary embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the exemplary embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor may read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention claimed is:

1. Power circuitry for an electronic device, comprising:
an antenna configured to wirelessly receive power via a wireless field generated by a transmit antenna; and
conversion circuitry configured to convert the received power to DC power and provide the DC power to a rechargeable storage cell to charge the rechargeable storage cell, and configured to alternatively provide the DC power to the electronic device via a connector that connects the conversion circuitry to the electronic device to power the electronic device directly,
the antenna, conversion circuitry, and the rechargeable storage cell housed in a common assembly, the common assembly configured to electrically and mechanically couple to the electronic device.

2. The power circuitry of claim 1, wherein the antenna and the conversion circuitry are further configured to send and receive near-field communication data.

3. The power circuitry of claim 2, wherein the antenna is further configured to be shared by both the power circuitry and one or more electronics of the electronic device.

4. The power circuitry of claim 1, further comprising a replacement housing portion configured to replace a corresponding housing portion of the electronic device and wherein
the antenna and the conversion circuitry are integrally formed with the replacement housing portion.

5. The power circuitry of claim 1, wherein the antenna and the conversion circuitry are configured to attach to an existing housing portion of the electronic device.

6. The power circuitry of claim 1, further comprising shielding located between the rechargeable storage cell and the antenna within the common assembly, wherein the shielding is configured to electromagnetically isolate the antenna from the rechargeable storage cell.

7. The power circuitry of claim 6, wherein the shielding comprises a ferrite material.

8. The power circuitry of claim 1, wherein the common assembly is configured to replace an existing battery of the electronic device.

9. The power circuitry of claim 8, wherein the common assembly has a substantially same form factor and a substantially same electrical contact location as the existing battery.

10. The power circuitry of claim 8, wherein a shape of the common assembly is configured to fit within a battery compartment configured according to a custom battery, AA, AAA, C cell, D cell, or 9-Volt cell.

11. The power circuitry of claim 1, wherein the rechargeable storage cell includes a chemical composition of lithium ion, nickel cadmium, or nickel metal hydride.

12. The power circuitry of claim 1, wherein the electronic device is configured as a cell phone, audio player, video player, personal digital assistant, computer, camera, toy, tool, remote control, or computer mouse.

13. The power circuitry of claim 1, wherein the common assembly is configured to attach externally to the electronic device to electrically connect the conversion circuitry to a connection of the electronic device.

14. The power circuitry of claim 1, wherein the antenna and the conversion circuitry are configured to retrofit the electronic device that originally lacked a wireless power reception capability.

15. The power circuitry of claim 1, further comprising a magnetically transparent packaging material configured to surround the antenna, the conversion circuitry, and the rechargeable storage cell and improve the wireless field.

16. A method for wirelessly receiving power at an electronic device, the method comprising:
wirelessly receiving power, via an antenna, via a wireless field generated by a transmit antenna;
converting, via conversion circuitry, the received power from the antenna to DC power; and
providing the DC power to a rechargeable storage cell and alternatively to the electronic device via a connector that connects the conversion circuitry to the electronic device to power the electronic device directly, the antenna, the conversion circuitry, and the rechargeable storage cell housed in a common assembly, the common assembly configured to electrically and mechanically couple to the electronic device.

17. The method of claim 16, further comprising receiving and converting near-field communication transmissions to the electronic device via the antenna.

18. The method of claim 16, wherein the antenna and the conversion circuitry are integrally formed with a replacement housing portion configured to replace a corresponding housing portion of the electronic device.

19. The method of claim 16, wherein a shield is provided between the rechargeable storage cell and the antenna within the common assembly to electromagnetically isolate the antenna from the rechargeable storage cell.

20. The method of claim 16, wherein the common assembly has a substantially same form factor and a substantially same electrical contact location as the existing battery.

21. The method of claim 16, wherein a shape of the common assembly is configured to fit within a battery compartment configured according to a custom battery, AA, AAA, C cell, D cell, or 9-Volt cell.

22. The method of claim 16, wherein the antenna and the conversion circuitry are configured to retrofit the electronic device that originally lacked a wireless power reception capability.

23. A wireless power receiver for an electronic device, comprising:

means for wirelessly receiving power via a wireless field generated by a transmit antenna;

means for converting the received power to DC power; and means for providing the DC power from the means for converting to a rechargeable storage cell to charge the rechargeable storage cell, and alternatively providing the DC power from the means for converting to the electronic device to power the electronic device directly, the receiving means, the converting means, the providing means, and the rechargeable storage cell housed in a common assembly, the common assembly configured to electrically and mechanically couple to the electronic device via the means for providing the DC power.

24. The wireless power receiver of claim 23, further comprising means for receiving near-field communication transmissions for the electronic device.

25. The wireless power receiver of claim 23, wherein the receiving means and the converting means are integrally formed with a replacement housing portion configured to replace a corresponding housing portion of the electronic device.

26. The wireless power receiver of claim 23, wherein the receiving means and the converting means are configured to retrofit the electronic device that originally lacked a wireless power reception capability.

* * * * *